Patented Jan. 9, 1923.

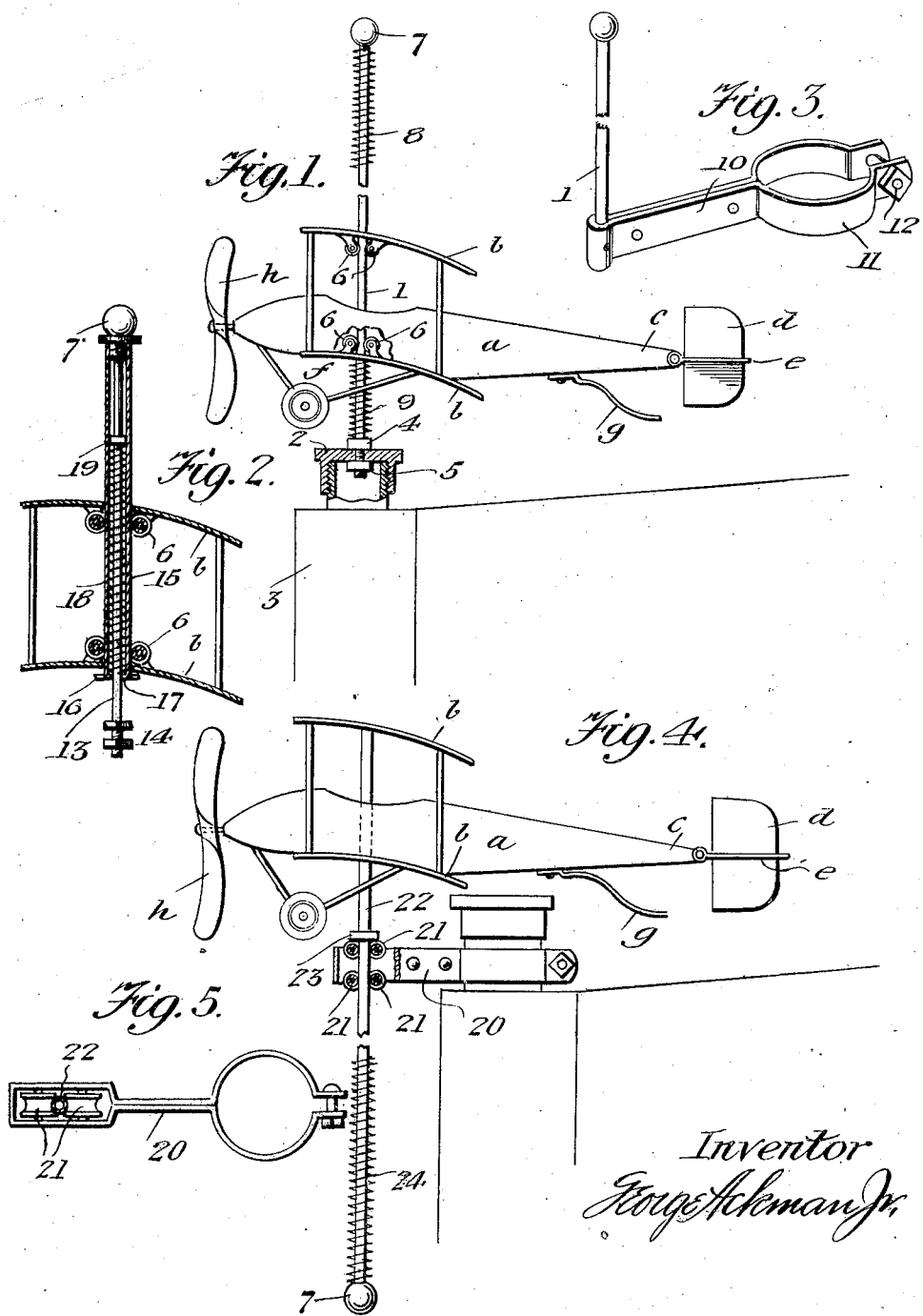

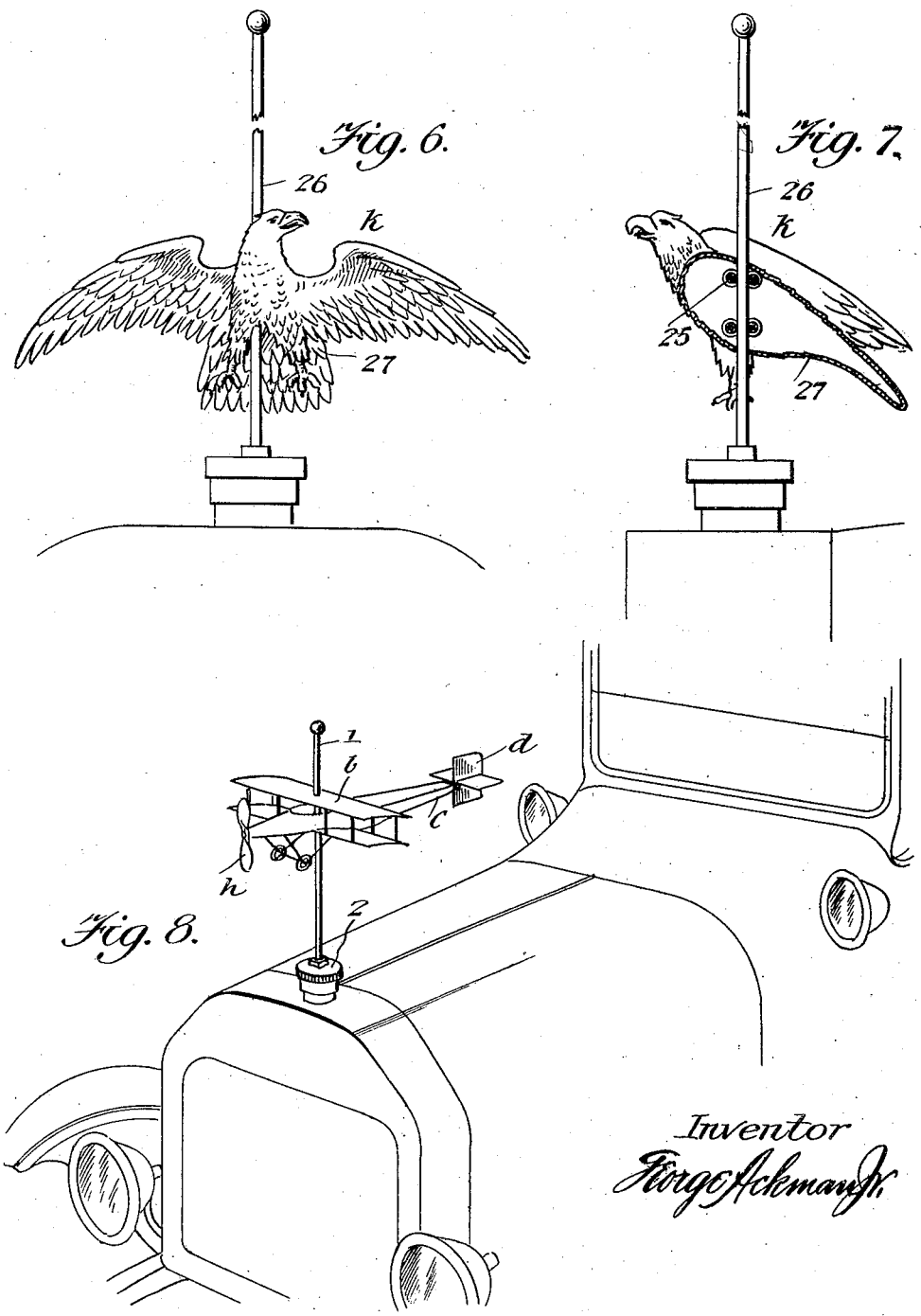

1,441,261

UNITED STATES PATENT OFFICE.

GEORGE ACKMAN, JR., OF WASHINGTON, DISTRICT OF COLUMBIA.

AERIAL DEVICE.

Application filed July 11, 1917. Serial No. 179,880.

*To all whom it may concern:*

Be it known that I, GEORGE ACKMAN, Jr., a citizen of the United States of America, residing at Washington, in the District of Columbia, have invented certain new and useful Improvements in Aerial Devices, of which the following is a specification.

This invention relates to aerial devices, the object in view being to produce a device of an entertaining, instructive and attractive character which may be mounted upon or carried by a vehicle and which, as it is propelled through the air in such a way, will be acted upon by the air or wind pressure so that it will rise or seek and attain a higher altitude, and also assume automatically a position in line with or head to the wind or current of air through which it is being propelled.

More specifically stated, the invention aims to provide a device to be mounted upon a vehicle having propelling means, said device embodying a guiding member, and an aerial device or aircraft structure mounted for up and down movement in relation to said guiding member and embodying a surface against which the air acts to cause the upward movement of said aircraft structure.

With the above and other objects in view, the invention consists in the novel construction, combination and arrangement of parts, herein fully described, illustrated and claimed.

In the accompanying drawings:—

Figure 1 is a side elevation of the aerial device, showing the same mounted upon the radiator cap of a motor vehicle, said cap and a portion of the neck of the radiator being shown in section.

Figure 2 is a vertical section through the aerial device taken centrally thereof showing a modification of the guiding means.

Figure 3 is a detail perspective view of the guiding member and one form of support and attaching means therefor.

Figure 4 is a view partly in side elevation and partly in section showing another form of guiding means.

Figure 5 is a detail plan view of the supporting and attaching means shown in Figure 4.

Figure 6 is a front elevation of an aerial device of modified formation.

Figure 7 is a fore and aft sectional view of the same.

Figure 8 is a perspective view showing the preferred location of the aerial device with respect to a motor vehicle.

In the preferred embodiment of the invention, I employ an airplane structure of any desired type, the ones illustrated in the drawings comprising a body $a$, one or more aerial lifting surfaces $b$, and directional surfaces $c$, $d$ and $e$. The aerial structure may also embody a conventional landing base $f$, a tail skid $g$ and a propeller $h$.

1 designates a guiding member shown in the form of an upright rod which passes through the lifting surface or surfaces $b$ at or adjacent to the center of gravity of the aerial device. Under the arrangement shown in Figure 1, the guiding member 1 is fastened to the cap 2 of the radiator 3 of a motor vehicle, the lower end of the guiding member 1 being shown as threaded and inserted through a hole in the cap 2 and having a shoulder or collar 4 resting on the cap 2, and a nut 5 upon the lower extremity of the member 1 bearing against the lower surface of the cap 2.

In order to reduce friction between the aerial device and the guiding member, the aerial device is shown as provided with anti-friction rollers 6 positioned to engage opposite sides of the guiding member 1. The member 1 has an enlargement or stop 7 at the upper extremity thereof and if desired, a coiled spring 8 may be placed around the guiding member 1 above the aerial structure and between the latter and the stop 7. The spring 8 will serve to yieldingly and increasingly resist the upward movement of the aerial device. Another spring 9 may be arranged under the aerial device, between the latter and the cap 2 for the purpose of cushioning the downward movement of the device.

Instead of mounting the guiding member 1 on the radiator cap as shown in Figure 1, the guiding member 1 may be carried by a support 10 illustrated in Figure 3, said support being in the nature of an arm extending forwardly from the radiator neck and embodying attaching means in the form of a split band 11 adapted to embrace the neck of the radiator and be securely held thereon by fastening means 12.

In Figure 2, I have shown a telescopic guiding member for the aerial device. In said Figure 2, the guiding means comprises an upright or rod 13 having attaching means 14 at the lower end thereof similar to the attaching means shown in Figure 1. Surrounding the rod 13 is a slidable tube 15 which extends through the lifting surface *b* of the aerial device and is engaged by the rollers 6. The tube 15 carries a stop 7 at the upper end thereof to limit the upward movement of the aerial device. At its lower extremity the tube 15 has one or more outturned portions 16 to contact with the support for the guiding means when the aerial structure is at the lower limit of its movement and the tube 15 is also provided at the lower extremity with one or more inturned portions 17 forming a seat for the lower extremity of a spring 18 which surrounds the rod 13 within the tube 15. The upper extremity of the spring 18 bears against a shoulder or collar 19 on the rod 13. Under the arrangement just described, the airplane structure first slides upwardly on the tube 15 until it comes in contact with the stop 7. Then said structure lifts the tube 15 and compresses the spring 18 more or less according to the speed at which the aircraft structure is driven.

Another form of guiding and supporting means is illustrated in Figures 4 and 5 in which the support 20 has the anti-friction guiding rollers 21 journaled thereon while the guiding member or rod 22 is movable up and down and has the airplane structure fastened to the upper portion thereof. The guiding member 22 has a shoulder or enlargement 23 to limit the downward movement of the structure and a spring 24 surrounding the lower portion of the guiding member 22 yieldingly resists the upward movement of the structure. The stop 7 will in this case be located at the lower extremity of the guiding member 22.

In Figures 6 and 7, I have shown an aerial device *k* in the form of a bird such as an eagle, the same being of hollow formation and carrying anti-friction rollers 25 which cooperate with the guiding member 26 and which are housed and concealed within the body of the figure. Such figure has an inclined lifting surface 27 so that the air will act thereon in the same manner that it acts on the lifting surfaces shown and described in connection with the preceding figures.

The modification shown in Figure 8 is a simplification of the embodiments disclosed in Figures 1, 2 and 4, inasmuch as the airplane structure is adapted to be raised by the action of the wind on the guiding member 1, and gravity is depended upon to restore said structure to its normal position when the structure is not subjected to wind or air pressure.

From the foregoing description taken in connection with the accompanying drawings it will now be seen that the aerial device proper is capable of an up and down movement in the relation to the guiding means therefor, said movement of the device being produced by the action of air currents on the lifting surfaces thereof. The faster the device is propelled through the air the greater will be the lifting effect thereon and by reason of the directional surface referred to, the device will always head toward the wind as it may oscillate or turn freely upon the guiding member. The general form of the aerial device proper may of course be varied to suit the manufacturer or individual user but it will probably be found the most attractive when made up in the form of an airplane which of course may be of the monoplane, biplane or other type. The guiding means is also susceptible of quite a number of changes which will readily suggest themselves. The device as a whole may be mounted upon various other kinds of vehicles besides motor vehicles such as bicycles, motor boats, marine vessels of all kinds, and in fact may be attached to any kind of craft whether used on water or land or in the air.

I claim:—

1. A display attachment for vehicles, including a rod, means for attaching the rod to a vehicle, an elongated body apertured at its forward end to receive the rod, slidable on the rod, planes extending laterally from the body at its forward end, a propeller rotatable at the forward end of the body, and a stationary rudder at the rear end of the body.

2. In a device of the character described, a vertical rod, and a miniature airplane body mounted on said rod to slide vertically and swing horizontally thereon, said airplane body being provided with planes causing it to be lifted on said rod when passed through a current of air, and with a rotatable propeller at its forward end and with a vertical tail plane adapted to keep the airplane body head on into the stream of air.

3. A display attachment for vehicles, comprising a rod, means to attach the rod to a vehicle, an elongated body with its forward portion associated with said rod and slidable vertically relative to said attaching means, planes extending laterally from the body at the forward portion thereof, a propeller rotatable at the forward end of the body, and a rudder at the rear end of the body.

4. In a device of the character described, a vertical rod, and a miniature airplane body associated with said rod to slide vertically and swing horizontally about the axis of the rod, said airplane body being provided with plane means causing it to be lifted about the axis of the rod when passed rapidly through the air and with a rotatable propeller at its forward end and with a vertical tail plane adapted to keep the airplane body head on into the air.

5. A display attachment for vehicles, comprising a rod, means to attach the rod to a vehicle, an elongated body with its forward portion associated with said rod and slidable vertically relative to said attaching means, the major portion of said elongated body in rear of the rod, and the body being provided on its forward portion with lateral plane means causing it to be lifted about the axis of the rod when passed rapidly through the air, and being also provided with tail means adapted to keep the body head on into the air.

In testimony whereof I affix my signature.

GEORGE ACKMAN, Jr.